July 11, 1939.  R. L. KIRK  2,166,058

SEQUENCE OPERATION CONTROL AND INTERLOCK SYSTEM

Filed Oct. 6, 1933  2 Sheets-Sheet 1

INVENTOR
Ralph L. Kirk
by
his attorney

July 11, 1939.　　　　R. L. KIRK　　　　2,166,058
SEQUENCE OPERATION CONTROL AND INTERLOCK SYSTEM
Filed Oct. 6, 1933　　　2 Sheets-Sheet 2
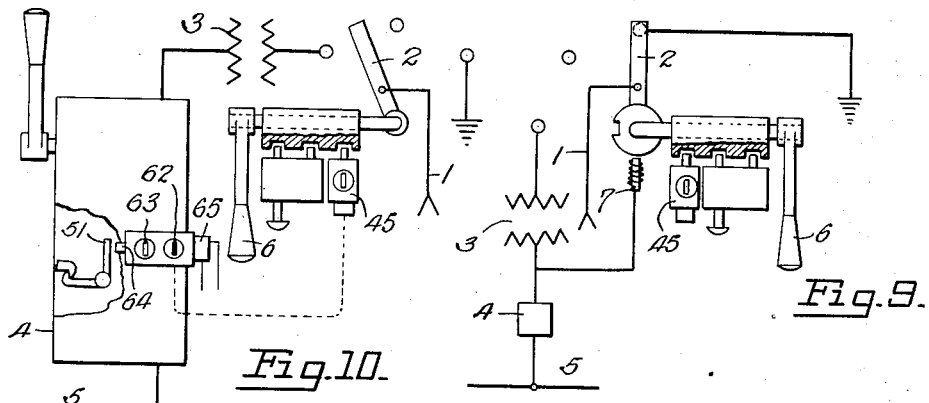
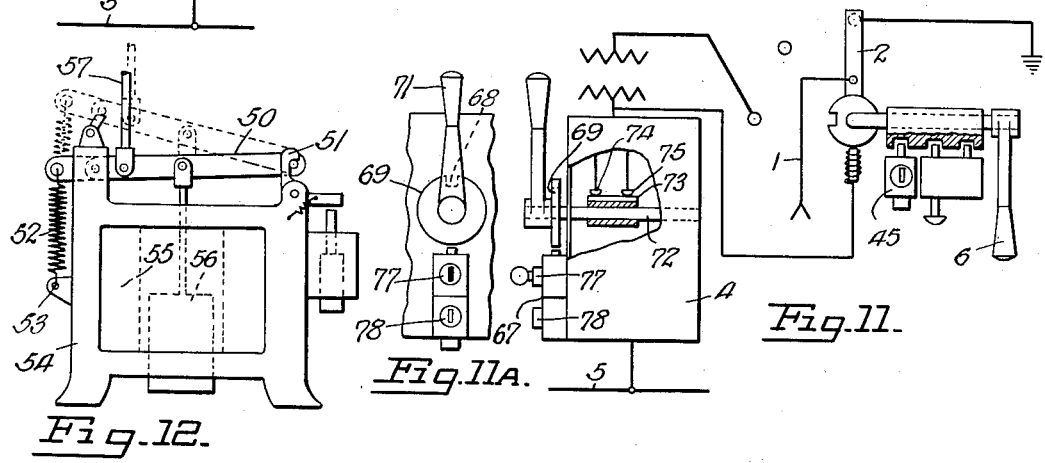
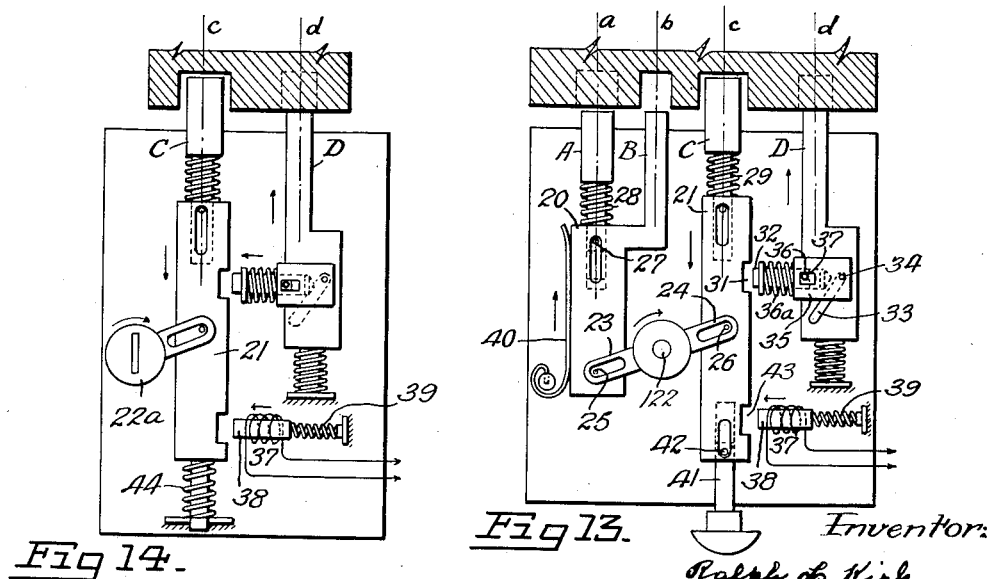
Inventor:
Ralph L. Kirk,
By Potter, Prince + Scheffler,
Attorneys.

Patented July 11, 1939

2,166,058

UNITED STATES PATENT OFFICE 2,166,058

SEQUENCE OPERATION CONTROL AND INTERLOCK SYSTEM

Ralph L. Kirk, Bellevue, Pa., assignor to Railway and Industrial Engineering Company, South Greensburg, Pa., a corporation of Delaware, as trustee Application October 6, 1933, Serial No. 692,456

21 Claims. (Cl. 171—97)

This invention relates to safety interlock systems and involves the application of special locks to standard electrical or mechanical equipment so as to require predetermined operation thereof, or operation in predetermined sequence, to insure the safety of operators and workers, and others who may have occasion to work upon the electrical or mechanical equipment, or upon associated circuits and apparatus.

One object of this invention is to provide an interlocking system for an electrical network distribution system containing a transformer, with a switch for connecting a high-tension supply line to the primary of the transformer, and with an automatically opening and re-closing circuit-breaker for connecting the secondary of the transformer to the network, in which the interlocking system may be made to function to render the circuit-breaker non-operative and to lock the circuit breaker in such non-operative position, after which the high tension switch may also be opened and locked in an open position, so that a repairman or operator may safely work upon the circuit and the associated apparatus, without the danger of an unauthorized or accidental re-closure and re-energization of the circuit.

In the network type of distribution system which is now being extensively applied, an automatic circuit breaker is provided for connecting a transformer to a load-supplying network distribution system. A high-tension supply line is arranged to be connected to the primary winding of the transformer by a two-way switch, operative in one closed position to connect the supply line to the transformer, and operative in its other closed position to connect the supply line to ground. The switch has an open position, of course, between the two closed positions.

The breaker between the low-tension or secondary winding of the transformer and the network system is controlled by suitable relay devices to close and to connect the transformer secondary winding to the network when the transformer is energized and is in energy-delivering condition with respect to the network. If the primary winding of the transformer is connected through the switch to the high-voltage supply line, the circuit-breaker on the low-voltage side of the transformer will be controlled by the relay devices to close automatically upon the energization of the supply line at the power house, without requiring the immediate presence of an attendant or operator at the network breaker.

The network breaker on the low tension side of the transformer also functions to open automatically when the network tends to feed energy back into the transformer, whether due to a fault in the transformer or whether due to the deenergization of the high tension supply line by the opening of the supply line at the generating station or sub-station. By opening the high tension line at the main station, the network breaker may therefore be remotely controlled to open automatically in response to the reverse or charging current that is fed back into the transformer when the transformer is no longer in energy-delivering condition.

When it is desired to work upon the breaker or the transformer or the associated circuit, the breaker and the transformer are isolated by opening the breaker and then throwing the high-voltage switch to the ground position, so that the high-voltage supply line will not be energized while the repairs or adjustments are being made. The switch should not be opened under load, of course, and the present practice is to provide an electromagnetic lock to lock the switch against movement from closed position so long as the supply line is energized. If the switch is open when it is desired to ground the high-voltage line, the recommended practice is to move the switch to closed position so that it may be electrically locked against movement from closed position if the supply line should be energized at that time. If the supply line is energized, the station operator may be called to open the supply line at the main station and the switch may then be moved from closed position to ground position. If the supply line should then be inadvertently energized at the main station, it would be immediately re-opened by its circuit breaker at the main station due to the ground on the line at the switch.

Prior to my present invention, when the switch was not in closed position, and the supply line was energized, there was nothing available that would always positively prevent the movement of the switch to ground position from its intermediate open position while the supply line was so energized. At the present stage of development of the foregoing network system, no satisfactory provision has been made that will always prevent moving the high tension switch from open position to ground position while the high-tension supply line is energized. The electromagnetic lock for the switch is energized from the secondary or low tension side of the transformer and therefore serves to indicate whether the supply line is energized, only if the transformer is at that time connected to the supply line, through the switch.

For that reason it is desirable, as a safety measure, before moving the switch from open position to ground position, that the switch be first moved to closing position in order to connect the supply line to the transformer, and, thereby, to enable the electromagnetic lock to check the electrical condition of the supply line before permitting the switch to be moved to ground position, when an operator or repairman desires to isolate the transformer and the network breaker in order to work upon them or to repair them.

It is therefore one of the primary objects of this invention to provide an interlocking and sequence control system and mechanism whereby the operation of the high-tension switch to ground position may be prevented until immediately after the switch has been first moved to closing position to check the electrical condition of the supply line.

Another object of the invention is to provide a particular method of, and mechanism for, effecting control of a switch, to compel its movement to one pre-selected position before permitting its movement to another pre-selected position.

In one form of the invention the interlocking system between the low voltage network breaker and the high voltage switch is arranged so that operation of a lock at the breaker will trip the breaker open and lock it in the open position, or, if the breaker is already open, the lock will lock the breaker in open position. The key in the lock is then released, so that it may be removed by the repairman, and used to operate the lock mechanism at the high-tension disconnect switch for proper testing in the manner previously described. If the supply line is found to be de-energized at that time the lock mechanism may be operated to permit the switch to be opened and moved to ground position, so that the supply line will be grounded until the repair work is finished. The switch may then be locked in this grounded position.

In this position both the high-tension disconnecting switch and the low voltage breaker are definitely locked against further motion. If desired, the key at the high voltage switch may be made removable in this locked grounded position, to permit the key to unlock the low voltage breaker and make it operative for inspection and maintenance, leaving the high-tension switch locked in its grounded position.

The key at the breaker may also be arranged to be non-operative to lock out the breaker until a supervisory key is inserted in an associated cylinder lock to release the lock-out key.

One type of automatic network system, in which I have applied the interlocking system and the sequence control embodying the principles of this invention, and preferred constructions of the sequence control mechanism are illustrated in the accompanying drawings, in which Figure 1 is a schematic single line diagram of a network transformer and its associated equipment;

Figure 9 is a diagrammatic view corresponding to the Figure 1, shown in greater detail to illustrate the arrangement and disposition of the various elements of the system, employing a two-bolt sequence lock for the switch;

Figure 10 is a diagrammatic view similar to Figure 9 but illustrating a two-cylinder lock and switch at the breaker to interlock with the high voltage switch;

Figure 11 is a similar diagrammatic view showing a different type of low-voltage breaker. Figure 11A is a fragmentary front elevation of the same;

Figure 12 is a schematic view of a trip-free operating mechanism for a circuit-breaker, shown in starting and in closed positions;

Figure 13 is a view similar to Fig. 5, illustrating a modification, and

Figure 14 is a view similar to Fig. 6, illustrating a modification.

Figure 1:
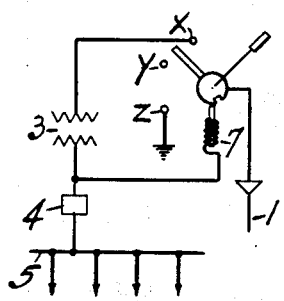

Figure 1 illustrates, in a simple schematic single-line diagram, the usual apparatus associated with a network transformer, including, briefly, a high voltage line 1 which is to be connected, through a manually-operable switch 2, to a network transformer 3, by which the voltage is reduced to the proper distributing voltage and supplied through a network circuit breaker 4 to the network system 5 from which the distribution feeder circuits proceed. The manually-operable switch 2 is provided with an operating handle 6 by means of which the switch may be moved to three positions, X, Y and Z. In position X the switch connects the high-voltage line 1 to the transformer circuit. When moved from position X to position Y, the switch opens the circuit between the high voltage line 1 and the transformer 3, and, when the switch is left in position Y, the high voltage line 1 and the transformer are disconnected, with the high-voltage line left open at the switch.

When work is to be done upon the equipment shown in the circuit in Figure 1, safety precautions require that the high voltage line 1 be connected by the switch 2 to ground, at position Z. In order to prevent the movement of the switch 2 to position Z to ground the high voltage cable 1, unless the cable is de-energized at the time, it is desirable to compel the switch 2 to be moved to position X in order to obtain a test or check upon the condition of energization of the high-voltage cable 1 before proceeding to position Z to ground the cable. If the cable were energized, it would of course be disastrous to permit the switch 2 to be moved to position Z to ground the cable. In order to prevent such movement when the cable is energized, a solenoid lock 7 is provided, and energized from the secondary of the transformer, to lock the switch at position X if the low-voltage side of the transformer is energized, thus providing a check upon whether the high-voltage line 1 is energized, and upon whether the network circuit breaker 4 is closed.

It is to require the movement of the switch 2 to position X before it can be moved to position Z, that the present locking mechanism is provided.

Figure 2:
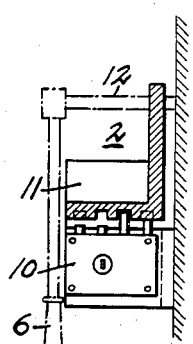
Figure 2 is a side view of the operating handle of the disconnect switch employed in the system in Figure 1, with an interlocking slotted segment mounted thereon to co-operate with a four-bolt lock to control the sequence of permitted operation of the switch.

In Figure 2 I have illustrated one arrangement in which a four-bolt lock 10 is applied to a control segment 11 mounted upon a shaft 12 which operates the switch 2 for connecting the high voltage line to the transformer 3. This application is used as an example of the manner in which the lock co-operates with a shaft whose movement is to be sequentially controlled between several positions, whether for the purposes described or for any other.

Figures 3, 4:
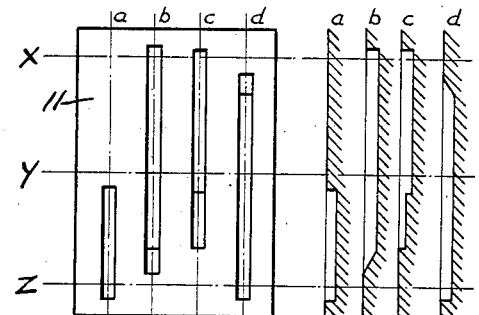
Figure 3 is a schematic plan view of the slots of the segment, developed.
Figure 4 is a schematic view showing lengthwise sections of the slots.

As shown in Figures 2, 3 and 4 the segment 11 is provided with four slots or grooves, respectively marked $a$, $b$, $c$, and $d$, and extending between the broken position lines X, Y and Z, corresponding to the three positions to which the shaft 12 may be moved, as illustrated in Figure 3. The shape or the depth of the slots or grooves with respect to the three positions to which the switch shaft may be moved, is shown in Figure 4.

As illustrated in Figures 3 and 4, groove $a$ is of constant depth extending from a point slightly beyond position Y to a point slightly beyond position Z. Groove $b$ extends from a point slightly ahead of position X to a point slightly ahead of position Z and is provided with an inclined portion at its end, adjacent position Z for a purpose to be described later. Groove $c$ extends from a point slightly ahead of position X to a point slightly beyond position Y, at which it rises sharply to have a shallower depth, and extends to a point just ahead of position Z. Groove $d$ extends from a point beyond position X to a point beyond position Z, being provided with an incline at the end adjacent position X.

Figure 5:
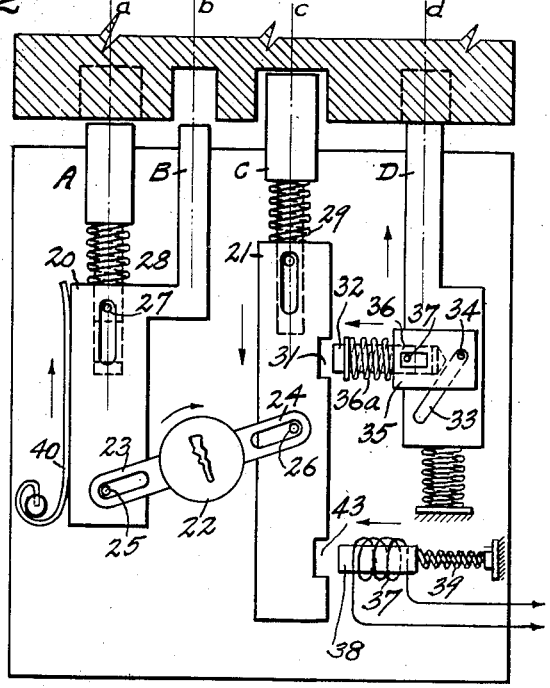
Figure 5 is a schematic front elevation of a four bolt sequence lock co-operating with the segment of the switch-operating shaft to control the sequential operation of the switch to pre-selected positions.

The lock mechanism 10, as illustrated in detail in Figure 5, comprises a locking bolt A supported in a movable bracket 20 which has an integral part thereof extending forward to constitute bolt B.

The lock mechanism further comprises a bolt C mounted upon a movable supporting bracket 21 in a manner similar to the mounting of bolt A in its associated bracket 20. A fourth bolt D, is also provided to selectively control the operation of the lock mechanism, to permit its operation by an external key only when the shaft of the switch, which is controlled by the lock mechanism, is in X position.

The two brackets 20 and 21 which support the bolts A, B and C are operatively connected to a key-operable cylinder lock 22 by means of two pins 25 and 26, respectively associated with the two supporting bracket 20 and 21, and extend through the corresponding slots of two slotted arms 23 and 24. The motion of the cylinder lock is transmitted through these slotted arms and the pins 25 and 26 to the supporting brackets 20 and 21.

The head of bolt A is supported upon a guide rod which extends into a recess in the bracket 20 in such manner as to permit a certain amount of lost motion between the head of the bolt A and the bracket 20, according to the position of a biasing spring 28, seated between the bolt head A and the bracket 20, that is, according to whether the spring 28 is compressed or released to force the head of the bolt A to an advanced position. The inner end of the rod of the bolt A is connected to the bracket 20 by a pin 27 which transmits downward movement of the bracket 20 to the guide rod of bolt A. The bolt C is similarly connected to its supporting bracket 21 to permit a slight degree of relative or lost motion between the bolt C and its bracket 21 while establishing a mechanical connection through which downward movement of the bracket 21 draws the bolt C downward.

The pin 27 is anchored in the guide rod of bolt A, and extends through a slot in the bracket 20 to limit the extended movement of the bolt head A in response to the biasing spring 28. The pin in bracket 21 is similarly anchored.

The bracket 21 is provided with a notch 31 on its side edge which is adapted to receive a spring-biased latch 32 when the locking mechanism is in normal position, permitting the switch or shaft to be moved to either position X or position Y. Movement of the latch 32, to lock the bracket 21 against longitudinal movement, or to permit such movement, is controlled by an unlatching bolt D. The function of the unlatching bolt D and its controlled latch 32 is to require the movement of the switch shaft to position X, before the lock mechanism may be operated, by a key in cylinder 22, to move the several bolts for the selective operation that will permit the subsequent movement of the switch to position Z.

The correlated function of the unlatching bolt D and its latch 32 is illustrated schematically by representing the bolt D provided with an inclined slot 33 which receives and actuates a pin 34 on a supporting bracket 35 within which the spring biased latch 32 is supported. The latch 32 embodies a guide rod 36 that fits into a recess in the bracket 35 and is arranged to have a certain amount of lost motion therein, through the medium of a spring 36A and a limit pin 37, in a manner similar to that already explained in connection with bolts A and C and their respective supporting brackets 20 and 21.

The operation of the lock mechanism will now be understood upon referring to Figures 3, 4 and 5.

The switch or shaft must be moved to position X before the locking mechanism can be selectively positioned to permit the switch or shaft to move to position Z. This can be seen upon referring to slot $d$, shown in Figure 3 and in Figure 4, which receives the unlatching bolt D. Until the switch or shaft is moved to position X, the bolt D extends into the bottom of the slot $d$ and holds the latch 32 in the notch 31 of the bracket 21 of bolt C. The bolt C is therefore held in its slot $c$, and limits the movement of the switch, as determined by the shape of the slot $c$, to movement between positions X and Y only. When the switch is moved to position X, bolt D rises up out of its slot $d$ and withdraws the latch 32 so that the bracket 21 may be actuated, by the key cylinder 22, to withdraw the bolt C from its slot. When the key cylinder 22 is rotatively operated, the bolt C is withdrawn, the bolt B is pressed downward into its slot, and the spring 28 behind bolt A is compressed between the head of the bracket 20 and the bolt A. In position X, bolt A is pressed against a solid surface, and spring 28 is compressed. A friction spring 40 holds the bracket 20 in such position to prevent it from moving downward except through the action of the relocking bolt B. The two biasing springs 28 and 29 are very light springs that are insufficient to overcome the friction resistance of the spring 40 in holding the bracket 20 in raised position. In this position the key cannot be removed from its cylinder 22.

The switch handle 6 may now be operated to move the switch to position Z, due to bolt C being withdrawn from its slot C. As the switch moves away from position X bolt D will slide back down into its slot but the latch 32 will merely engage and ride against the side edge of the movable bracket 21 above the notch 31, so that latch 32 will be ineffective to latch the bracket 21 until that bracket is again forced back to its upper position, as illustrated. Bolt C, during the movement from position X towards position Z will be entirely out of its slot until the switch is moved to position Z, at which position it will be moved to press against the solid surface beyond the end of its slot, as will now be explained.

When the switch passes position Y on its way to position Z, the bolt A will fall into its slot under the influence of the biasing spring 28 which is under compression, thus preventing return of the switch to position X until the switch completes its travel to position Z. Relocking bolt B is still riding in its slot b, inserted to its full depth.

The movement of the switch continues to the point just ahead of ground position Z, at which point relocking bolt B rides upward on the incline at the end of its slot b and rides out of the slot onto solid surface. This movement of bolt B forces bracket 20 downward and withdraws bolt A entirely from its slot at position Z. Downward movement of bracket 20, however, rotates the two slotted arms 23 and 24, thereby moving the lock cylinder 22 to its initial position, and also thereby moving bracket 21 to its raised position to compress the biasing spring 29 against the bolt C which is engaging solid surface, just beyond the end of its slot c. In this initial position of the cylinder the key can be removed from the cylinder 22. The switch must therefore be moved to position Z before the key can be removed, if the bolts have been preset, unless the key is rotated back by hand which operation moves the bolts back to initial position, again preventing the movement of the switch past position Y toward position Z.

The function of the various bolts may now be better appreciated. Upon reference to Figure 4 it will be seen that as soon as the switch is moved beyond position Y toward position Z, the bolt A drops into the slot a, thereby preventing return of the switch from position Y to position X until the switch has been moved all the way to position Z, so that the relocking bolt B may withdraw the bolt A from its slot to permit the switch to be subsequently returned to position X. When the switch is now moved from ground position Z towards open position Y, the bolt C will drop into the shallow portion of the slot c as soon as the switch contacts are disengaged from the ground contacts, thereby preventing the switch from being moved back to ground position Z, as a result of which the switch can only be moved in the direction towards open position Y. When it is moved further and reaches position Y, the bolt C drops down into the deep part of its slot so that the switch cannot be moved back towards ground position Z again until the switch has again been moved first to position X. When the switch has been moved into position Y, where the bolt C drops into the deep part of its slot, the latch 32 of bolt D drops into the notch 31 of the bracket 21 to prevent readjustment of the locking mechanism by the key until the switch has again been moved to position X.

If it is not desired to use a cylinder lock and key to operate this sequence interlock, so that only authorized persons may ground the cable, the lock as shown in Fig. 13 may be provided with a pull rod 41 having a lost-motion connection with movable bracket 21 of bolt C. The pull rod 41 supports a pin 42 which extends through a slot in an extension of bracket 21 so that the bracket 21 may be moved downward by hand when latch 32 is withdrawn from notch 31, but cannot be reset by hand because of the lost motion between pull rod 41 and bracket 21. With such constructions, the slotted arms 23 and 24 are secured to each other and mounted on a suitable pivot support 122 at the mid-position corresponding to the position of the cylinder 22 of Fig. 5.

The lock can thus be unlocked by hand, through the pull rod 41, but can only be relocked by movement of the switch to ground position Z, at which position the unlocking bolt B withdraws bolt A so the lock bolts can go back to their initial positions. Other equivalent lost-motion means may be substituted for the pull rod 41 to operate the bolt B in the manner described.

Lest the solenoid lock 7 burn out at any time and permit the operator, even if he moved the switch to position X first, to move the switch to the grounded position, with disastrous results, it seems desirable to add a further safeguard to the sequence lock just described. This can be done as shown in Fig. 5 by including, in the lock, a small electric solenoid 37 for actuating a plunger or latching pin 38 against the action of biasing spring 39, in such manner, that when the solenoid is energized from the low voltage side of the transformer it will force the pin 38 into a slot 43 in an extension of bracket 21, which would prevent the sequence lock from being unlocked if the cable was energized. This then gives a double check, and it is hardly likely that both solenoids would be burned out at the same time, particularly inasmuch as the small lock solenoid 37 carries very little current. The small lock solenoid 37 serves a further purpose, since, if the lock cannot be operated to be preset when in position X, it indicates that the cable is energized. This provides a quick simple test independent of the switch, to determine if the cable is energized. The solenoid lock can be omitted, if desired.

The sequence locking mechanism described above or a modification thereof may therefore be used with any movable element, whether such element has rotary or translatory motion, to insure a predetermined sequence of operation, such as illustrated here, in which the movable element, must first be moved to one selected position before it may be moved to another selected position.

For the purpose of illustration I have described the four-bolt locking mechanism in Figure 5 as being applied to the switch associated with the network transformer, to illustrate its application to a movable member having a rotary type of motion. Obviously the sequence lock may be applied to any movable member whose operation is to be selectively controlled in similar manner.

For specific application to a network transformer a two-bolt modification of the four-bolt lock just described, may be desirable, not only to simplify the application but to give further precautionary measures to insure that the switch will actually be moved to position Z when the sequence lock is unlocked and preset. With the four-bolt lock, if the key is turned and left in place, the switch blade may be later moved to position Z after the cable has been energized. This operation would be disastrous and is undesirable with network transformer switches although it may be desirable in other applications of sequence locking.

Figure 6:
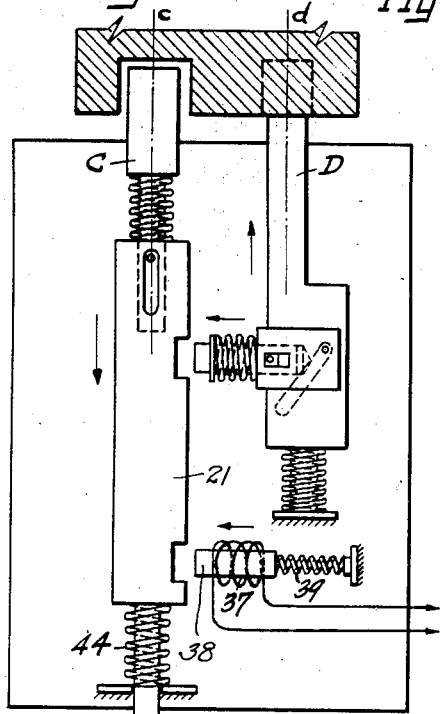
Figure 6 is a schematic front elevation of a two-bolt sequence lock that is a modification of the four-bolt lock and that employs only part thereof.

The two-bolt modification is shown in Figures 6, 7, 8 and 14. In this modified two-bolt arrangement, the bolts C and D only are employed, similar to those shown in the assembly in Figure 5. The key-operated lock cylinder 22a as shown in Figure 14 or the hand lever 40 as shown in Figure 6 may be used to operate the bracket 21 associated with bolt C so that bolt C may be pulled out of its slot c, against the biasing force of a return spring 44. The bracket 21 is then held in downward position, with the bolt C withdrawn, by one hand, while the operator moves the switch handle to position Z with his other hand. By means of this arrangement requiring the use of both hands to effect simultaneous operation, assurance is provided that the lock mechanism cannot be set in a position that would permit the switch to be moved to position Z without actually requiring that the switch be moved to that position while the lock mechanism is being set and held so. By means of the arrangement shown, requiring simultaneous two-hand operation, a greater degree of safety is assured.

If the hand lever 40 is not used to hold bracket 21 and bolt C down, a key cylinder 22a may be employed which must be held by one hand to keep bolt C and its bracket 21 down until the switch is operated. The bolt C and the key cylinder 22a are biased by a return spring 44 that returns the bolt C and the cylinder to their initial positions if the key cylinder is not held.

Figures 7, 8:
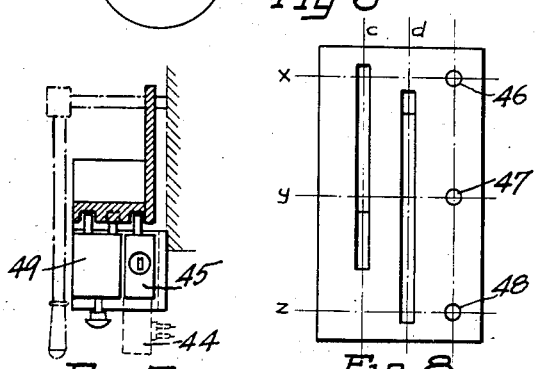
Figure 7 is a side view of the two-bolt sequence lock and its co-operating two slot segment mounted on the switch shaft, and its associated control lock for three engaging holes in the rotating segment.
Figure 8 is a schematic plan view of the segment in Figure 7, developed.

In Figures 7 and 8 I have illustrated the application of the modified locking mechanism 49 to a drum segment, mounted as a bracket, on the shaft of the switch. In addition I have provided a lock 45 by means of which the segment and the switch may be locked in any one of the three positions to which they may be moved, which lock may also be used in conjunction with the four bolt sequence lock. The lock 45 is so arranged that the key can be removed only when the bolt of the lock is in extended position in any one of the recesses 46, 47 or 48 of the segment, corresponding to the individual positions to which the switch may be moved. When the switch is locked in any one of these three positions an authorized person can then remove the key and be sure that the switch will not be operated by an unauthorized person. An assurance of safety is thus provided for the person with the key while working on the associated circuit.

The key for operating the lock 45 may be held by a foreman or by a similar supervisor of a repairing crew, or by a single repairman, as the case may be, so that after the switch is locked in position at any one of the three positions by the lock 45 the key will be retained by the repairman or by the supervisor, to assure him that no operation of the switch may be made without his knowledge. No operation of the high-tension switch can be made, of course, if the switch is in the transformer-energizing position while the supply line is energized, because of the safety lock 7 energized from the transformer secondary and associated with the switch operating shaft, as illustrated in Figures 1 and 9.

In the modification shown in Figure 7, I have also illustrated a solenoid lock 44 which may be employed, if desired, for preventing the operation for the mechanism in case the cable is energized, as explained above for the four-bolt lock shown in Figure 5.

The system may also be arranged to provide for interlocking between the high-tension switch 2 and the low voltage circuit breaker 4. In that case, the low voltage breaker is first locked against electrical or mechanical operation, and a key released to provide access to the high-voltage switch to permit it to be moved to desired position.

The construction of low-tension network circuit breaker, as now employed in network systems, is such that the mechanism for operating the breaker is responsive to circuit conditions, and is automatically operable to close the breaker or to open it.

The breaker is constructed to operate automatically, if desired, but it may also be set to suspend the automatic control and to be operable only manually. The automatic control may be made non-effective electrically by opening the circuit of an operating or closing coil; and it may be made non-effective mechanically by opening a mechanical connection of a trip-free mechanism associated with the breaker. Opening the mechanical connection of the trip-free mechanism will also prevent manual reclosing. The primary purpose of the trip-free mechanism is to prevent holding the breaker closed on a short-circuit. It provides a readily available mechanism, however, for locking the breaker against operation for safety interlocking purposes, as contemplated herein.

The operating mechanism itself, that is employed to operate the circuit breaker, is not a part of my invention. I am illustrating it in simple schematic form, in Figure 12, as of the trip-free type. As shown, a main lever 50 is arranged to be anchored at its right-hand end by a pivoted latch 51. The left-hand end of lever 50 is connected to one end of a powerful retrieving spring 52, the other end of which is anchored at point 53 to the frame 54. When the breaker is to be closed, a closing coil 55 is energized and raises a plunger 56 to impart upward movement to the lever 50 about the pivot point where the lever is anchored at the latch 51. The upward movement of the lever 50 actuates an operating rod 57 which closes the contacts of the breaker, the operating rod 57 being held in its upper or closed position by a holding latch 61. In case of trouble on the associated circuit that is controlled by the circuit-breaker, the trip coil 58 is energized by a suitable relay or by excessive current and raises its plunger 59 to strike the pivoted latch 51 and move the pivoted latch to release the operating lever 50, which thereupon slides off holding latch 61. The restoring spring 52 immediately pulls the lever 50 and the operating rod 57 downward to open the breaker.

Figure 12 shows the operating lever 50 in its raised position where it is held against the return spring by the latch 61.

Such trip-free mechanism may be considered as part of the breaker in Figure 10, the latch 51 of Figure 10 corresponding to the anchoring latch 51 of Figure 12.

When the high-tension switch is to be moved, the low-voltage breaker is first locked against operation, by locking the latch 51 in non-engaging position. For this purpose, a two-cylinder lock is provided, having two cylinders 62 and 63, a bolt 64, and a switch 65 for controlling the circuit of the operating coil of the circuit breaker.

A key for operating the lock 45 at the high-tension switch is normally held in the cylinder 62 and is arranged to be released from the cylinder 62 when the associated tumbler 63 is operated by a supervisory key. With the arrangement as shown in Figure 10, the operation of the lock cylinder 63 by the supervisory key, in addition to moving the cylinder 62 to release the interlock key, also moves the lock bolt 64 to a position where it locks the pivoted latch 51 in non-latching position, thereby opening the breaker and making it electrically and mechanically non-operative, as the mechanism can not become anchored or otherwise effectively positioned to enable the associated closing mechanism (not shown) to operate, as a result of which the breaker is effectively locked in open position.

After the interlock key is removed from the cylinder 62, the supervisory key is retained in cylinder 63 against removal, and the breaker is held non-operative until the interlock key is restored and the bolt 54 retracted.

The interlock key, when released from cylinder 62, may then be used to operate the lock 45 at the high-tension switch handle, to permit the switch to be moved to another position, where it may be locked against further movement. After that, the interlock key may be removed and retained by the repairman or the foreman until the repair work is completed. The high-voltage switch can thus be locked at any desired position, and the interlock key may then be replaced in the cylinder 62 at the low-voltage breaker, if desired, in order to release the supervisory key from its cylinder 63. In order to prevent energization of the automatic equipment of the low-tension breaker 4, during a repair job, even though the breaker cannot be reclosed the operating circuit for the closing coil may also be opened by the switch 65 associated with the lock at the low-voltage breaker. If desired, the switch may be employed to control a signal circuit.

In Figures 11 and 11a I have illustrated another arrangement whereby the low-voltage breaker may be locked against operation both mechanically and electrically, when it is desired to work upon the breaker or the low-tension apparatus. A lock 67 is provided that is mounted to permit its bolt to be extended into recess or notch 68 in an annular plate 69 secured to the operating handle 71 of the low-voltage 4. The operating handle 71 of the breaker controls a shaft 72 upon which a drum segment 73 is mounted to serve as a bridging contact between two terminal fingers 74 and 75 for completing the circuit of the closing coil 56 of the breaker, when the handle is in its upright position, as indicated in Figures 11 and 11a. When the handle is moved to intermediate horizontal position, the automatic closing feature, as controlled by the closing coil of the mechanism, is eliminated by opening the circuit at the contacts 74 and 75. The breaker remains mechanically closed, however, while the handle is in horizontal position. Movement of the handle to lowermost position, below horizontal, mechanically opens the circuit breaker. Since the closing coil circuit is already opened, the breaker is both mechanically and electrically open when the handle is in this position.

The lock 67 is preferably provided with two cylinders, similar to the lock shown in Figure 10. One cylinder 77 normally retains its key, which is the interlock key, until the other cylinder 78 is operated by a supervisory key.

The interlock key can then be withdrawn from cylinder 77 after it is rotated to extend the lock bolt into the recess in plate 69, to mechanically lock the breaker against unauthorized or automatic operation. The interlock key may then be used to operate the lock 45 at the high-voltage switch.

With the arrangement illustrated in Figures 10 and 11, after the high-tension switch has been lock in desired position, such as the open position or the ground position, the interlock key may be removed from the lock 45 at the high-tension switch and restored to its cylinder 77 at the breaker lock to permit testing the operation of the breaker 4.

When the breaker is to be locked against automatic operation with a lock mechanism, such as shown in Figure 10, I prefer to locate the lock so that the bolt of the lock will normally strike the side surface of the latch 51, as in Figure 14, in order to require intentional operation of the latch to trip the breaker open, in case it should be closed, before the lock bolt may be inserted in position to hold the latch 51 in non-engaging and non-effective position.

My invention is not limited to the specific details illustrated, since they may be modified without departing from the spirit and scope of the invention as set forth in the appended claims.

I claim as my invention:

1. The combination with a two-position switch associated with a network transformer and serving to connect the transformer to a power line when closed in one position and to ground when closed in the second position, and means for moving the switch to closed position, to open position and to grounding position; of means associated with the moving means for compelling movement of the switch to closed position before permitting movement of the switch to grounding position.

2. The combination with a two-position switch with a network transformer and serving to connect the transformer to a power line when closed in one position and to ground when closed in the second position, and means for moving the switch to closed position, to open position and to grounding position; of means associated with the switch-moving means for compelling movement of the switch to closed position before permitting movement of the switch to grounding position, and means for testing for energization of said power line, when the switch is closed, to prevent operation of the controlling device when the cable or associated transformer is energized.

3. In an electrical network distribution system, the combination with a transformer, a supply circuit and a manually operable switch, movable to one closed position to connect the supply circuit to the transformer, movable to a second closed position to connect the supply circuit to ground, and movable to open position between the closed position and the ground position, of means for controlling the movement of the switch comprising a blocking bar for permitting free movement of the switch between the first closed position and the open position but preventing free movement of the switch to the ground position, means for withdrawing the blocking bar to also permit free movement of the switch to ground position, and means for preventing the withdrawing of the blocking bar except when the switch is in closed position.

4. In an electrical network distribution system, the combination with a transformer, a supply circuit and a manually operable switch, movable to one closed position to connect the supply circuit to the transformer, movable to a second closed position to connect the supply circuit to ground, and movable to open position between the closed position and the ground position, of electromagnetic means connected to the low-tension side of the transformer to be energized when the transformer is connected to, and energized from, the supply line through the switch, means controlled by said energized means for locking the switch in closed position only if the switch is in such position when the electromagnetic means is energized, and means for preventing movement of the switch to ground position except directly after the switch has been first moved to closed position, and the electromagnetic means is not energized, whereby the energized condition of the supply line may be ascertained and the switch locked against movement to ground if the supply line should be energized when movement of the switch is attempted.

5. In an electrical network distribution system, the combination with a transformer, a supply circuit and a manually operable switch, movable to one closed position to connect the supply circuit to the transformer, movable to a second closed position to connect the supply circuit to ground, and movable to open position between the closed position and the ground position, and an electromagnetic lock connected to the low-tension side of the transformer and mechanically related to the switch to lock the switch in closed position and to prevent its movement from closed position when the lock is energized, but to permit the switch to move from closed position when the lock is not energized; of a control position indicating segment secured to and movable with the switch, and a movable biased lever lock mechanism co-operative with the control position indicating segment to permit free movement of the control position indicating segment and the switch between the closed and open positions while the electromagnetic lock is de-energized, and means for presetting the lock mechanism, only when the switch is in closed position, to permit the switch to be then moved to ground position.

6. In an electrical system, the combination with a feeder circuit, a supply circuit, and a switch for connecting the supply circuit to the feeder or to ground, and movable to open position between the closing and the ground positions, of means for controlling the switch to prevent its movement to ground position except immediately after the switch has first been moved to closed position, although permitting free movement of the switch between open and closed positions, said means comprising a slotted sector secured to and movable with a movable actuating member of the switch, and lock mechanism disposed adjacent the sector to co-operate therewith to control the switch movements, said lock mechanism comprising a retractible blocking bolt biased to extend into a slot in the sector extending between closed and open positions to permit the sector and the switch to be moved at will between closed and open positions, a lock for controlling the retraction of the blocking bolt, and a latching bolt responsive to the position of the sector and the switch for latching the retractible blocking bolt against withdrawal except when the sector and switch are in closed position, at which position the sector moves the latching bolt to its non-latching position, to permit the blocking bolt to be unlocked and withdrawn from the sector slot so that the sector and the switch may be then moved to ground position.

7. In an electrical system, the combination with a feeder circuit, a supply circuit, and a switch for connecting the supply circuit to the feeder or to ground and movable to open position between the closing and the ground positions, of means for controlling the switch to prevent its movement to ground position except immediately after the switch has first been moved to closed position, although permitting free movement of the switch between open and closed positions, said means comprising a sector and a lock bolt mechanism, the sector having a first slot extending from ground position to a point short of closed position and rising by an inclined section to the top surface plane of the sector, said sector having a parallel second slot extending from closed position to open position at one depth and from open position to only a point between open and ground positions at a lesser depth, the continuing portion of the sector to ground position beyond the shallow part of the slot being at the height of the top surface plane of the sector; and said lock mechanism comprising a blocking bolt adapted to extend into or to be withdrawn from the second slot in the sector, means biasing the blocking bolt toward and into the second slot, means for withdrawing the blocking bolt against the force of the biasing means, and a biased latching bolt adapted to extend into the first slot in the sector and embodying a latch extending into the blocking bolt when the latching bolt is in the first slot and withdrawing from the blocking bolt when the latching bolt moves out of the first slot at closed position, whereby the blocking bolt is unlatched to permit its withdrawal only when the sector and the switch are at closed positions, so that the sector and the switch may thereupon be moved to ground position while the blocking bolt is held in withdrawn position above its slot, the biased blocking bolt functioning to drop into the shallow part of the second slot when the switch is moved from ground position toward open position, to thereby prevent the switch from being moved back to ground position until it has been again first moved to closed position.

8. In an electrical system, the combination with a feeder circuit, a supply circuit, and a switch for connecting the supply circuit to the feeder or to ground, and movable to open position between the closing and the ground positions, of means for controlling the switch to prevent its movement to ground position except immediately after the switch has first been moved to closed position, although permitting free movement of the switch between open and closed positions, said means comprising a slotted segment and a co-operating lock mechanism embodying a blocking bolt biased to enter and ride in the slot in the segment, the slot having a deep portion shaped to permit free movement of the bolt in the slot when the segment and switch are moved between closed and open positions, and a continuing adjoining shallow portion extending from the end of the deep portion to a point short of the point representing the ground position, the segment being at normal height beyond the shallow slot and to ground position, means for latching the blocking bolt against withdrawal except when the switch and the segment are in closed position, and means for withdrawing and holding the blocking bolt entirely free from the segment, against the biasing force, so that the switch and the segment may be moved to ground position, whereupon the blocking bolt may be released to rest against the segment top surface out of the slot, the biasing means on the blocking bolt serving to force the bolt into the shallow slot when the switch and segment have been moved sufficiently to open the switch at the ground position.

9. The combination with a switch associated with a network transformer and serving to connect the transformer to a power line when closed, and means for moving the switch to closed position, to open position and to grounding position; of means associated with the moving means for preventing movement of the switch from open position to grounding position unless the switch has been first moved to closed position to test whether the power line is energized.

10. The combination with a switch associated with a network transformer and serving to connect the transformer to a power line when closed, and means for moving the switch to closed position, to open position and to grounding position; of means connected to the transformer to respond to an energized condition of the transformer when the transformer is connected to the supply line by the switch, means associated with said means to lock the switch against movement from closed position when said energizable means is energized from the transformer, and means for controlling the movement of the switch, said means being responsive to the movement of the switch to any position and being subject to presetting only when the switch is in closed position, to permit immediate subsequent movement of the switch to grounding position.

11. The combination with a switch associated with a network transformer and serving to connect the transformer to a power line when closed, and means for moving the switch to closed position, to open position and to grounding position; of means for preventing movement of the switch to ground position unless it has been moved to closed position immediately preceding the movement to ground position in order to test whether the power line is then energized, said means comprising a slotted segment secured to the switch moving means and movable therewith in accordance with the switch movement, and lock mechanism co-operative with the slotted segment to control its movement and, thereby, the movement of the switch, said mechanism comprising a blocking bolt arranged in an advanced position relative to the segment to permit free movement of the switch between closed and open position when the power line is not energized, means biasing the bolt to its advanced position, means for withdrawing the bolt from advanced position, a key-type lock for locking the bolt against withdrawal except when the lock is operated by proper key, a latch for further locking the bolt against withdrawal except when the switch is in closed position, and an electromagnetic latch responsive to the condition of the power line for locking the blocking bolt against withdrawal except when the power line is de-energized.

12. The combination with a switch associated with a network transformer and serving to connect the transformer to a power line when closed, and means for moving the switch to closed position, to open position and to grounding position; of means for controlling the switch-moving means comprising a pre-shaped segment secured to and movable with said switch-moving means, and a stationary lock mechanism provided with a blocking bolt to selectively co-operate with said segment, and means for controlling said blocking bolt to permit free movement of the switch-moving means and the switch to ground position, comprising means responsive to movement of the switch to closed position, means responsive to the electrical condition of the power line, and a key-type lock.

13. In a system of the character described including a switch movable to closed position, to open position and to ground position in the order named, mechanism for controlling the switch to prevent movement to ground position except immediately after movement to closed position, comprising a member movable with the switch and a stationary member co-operative therewith, one member having a slot therein and the other member having a retractible blocking bolt biased to enter the slot in the first member, a lock for withdrawing or permitting withdrawal of the blocking bolt, and a latch for limiting the position at which the blocking bolt may be withdrawn, to the position of the first member corresponding to the closed position of the switch.

14. In a system of the character described, the combination with a switch operable to connect a supply line to a transformer in one closed position of the switch, to connect the supply line to ground in another closed position of the switch, and movable to open position between both closed positions; of means for normally permitting free movement of the switch between connecting position and open position, but not between open position and ground position, means for selectively controlling said means to permit movement of the switch to ground position, and means responsive to return movement of the switch from ground position, sufficiently to open its connection at the ground position, for preventing movement of the switch back to ground position again until the selective controlling means has been again operated.

15. In a system of the character described, the combination with a switch operable to connect a supply line to a transformer in one closed position of the switch, to connect the supply line to ground in another closed position of the switch, and movable to open position between both closed positions; of means for normally permitting free movement of the switch between connecting position and open position, but not between open position and ground position, means for selectively controlling said means to permit movement of the switch to ground position, and means for locking the selective controlling means to prevent the normally permitted movement of the switch to ground position so long as the supply line and the transformer are energized.

16. In a system of the character described, the combination with a switch operable to connect a supply line to a transformer in one closed position of the switch, to connect the supply line to ground in another closed position of the switch, and movable to open position between both closed positions; of means for normally permitting free movement of the switch between connecting position and open position, but not between open position and ground position, and means responsive to predetermined movement of the switch at or from the ground position for restoring the limiting control of the permitting means.

17. In combination, a switch, an actuating member therefore movable through a predetermined path and angle, a member proportionately movable by the actuating member to occupy a position indicative of the position occupied by the switch, a key-operable blocking bolt for limiting the movement of the switch, and means responsive to movement of the proportionately movable member to a position corresponding to a terminal position of the switch for controlling the blocking bolt.

18. Switch mechanism comprising a switch movable to two terminal positions, an actuating member therefor, a terminal-position indicator controlled by said actuating member and operative to indicate by its position that the switch has been moved to terminal position, a lock embodying a blocking bolt for controlling the movement of the switch, and means for controlling the movement of the blocking bolt dependent upon movement of the position-indicator to a terminal position.

19. The combination with a switch and an actuating member therefor, of means for controlling the movement of the switch, comprising a sector having a slot and movable by the actuating member in accordance with the movement of the switch, a key-operable bolt movable into and out of the slot, and means for controlling the movement of the bolt to permit a movement with respect to the slot only while the sector is in a terminal position.

20. The combination with a switch associated with a network transformer and serving to connect the transformer to a power line when closed, and means for moving the switch to closed position, to open position and to grounding position; of means for controlling the movement of the switch comprising a guide segment having one slot at one level from closed position to open position, a biased guide finger extending into the slot to limit the movement of the switch between the limits of said slot, and means at the closed position of the switch for permitting the biased finger to be moved from the slot at the first level to a second level at which it may have free unobstructed movement in a path between closed position and grounding position.

21. The combination with a switch associated with a network transformer and serving to connect the transformer to a power line when closed, and means for moving the switch to closed position, to open position and to grounding position; of means for controlling the movement of the switch comprising a guide segment having one slot at one level from closed position to open position, a biased guide finger extending into the slot to limit the movement of the switch between the limits of said slot, means at the closed position of the switch for permitting the biased finger to be moved from the slot at the first level to a second level at which it may have free unobstructed movement in a path between closed position and grounding position, a supporting surface for maintaining the guide finger at the second level against its biasing force while the switch is at ground position, said surface terminating a short distance from ground position towards open position, whereby, upon movement of the switch from ground position toward open position, the biased guide finger will drop from the upper level to a position at which the switch is prevented from moving back directly to ground position and from which the finger and the switch can be moved only to or towards open position again.

RALPH L. KIRK.